United States Patent
Nishiyama (10) Patent No.: US 10,021,147 B2
(45) Date of Patent: Jul. 10, 2018

(54) COMMUNICATION CONTROL DEVICE AND METHOD OF CONTROLLING COMMUNICATION CONTROL DEVICE FOR DETERMINING WHETHER NON-STANDARD COMMUNICATION IS POSSIBLE BASED ON NON-STANDARD COMMUNICATION INFORMATION REPRESENTING WHETHER EACH OF THREE TYPES OF NON-STANDARD COMMUNICATION IS POSSIBLE

(71) Applicant: KYOCERA Document Solutions Inc., Osaka-shi (JP)

(72) Inventor: Masahiro Nishiyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 351 days.

(21) Appl. No.: 14/805,010

(22) Filed: Jul. 21, 2015

(65) Prior Publication Data

US 2016/0028779 A1    Jan. 28, 2016

(30) Foreign Application Priority Data

Jul. 24, 2014 (JP) ................. 2014-150561

(51) Int. Cl.
*H04L 29/06* (2006.01)
*H04L 29/08* (2006.01)

(52) U.S. Cl.
CPC ...... *H04L 65/1069* (2013.01); *H04L 65/1006* (2013.01); *H04L 65/1046* (2013.01);
(Continued)

(58) Field of Classification Search
CPC .................................................. H04W 4/14
See application file for complete search history.

(56) References Cited

U.S. PATENT DOCUMENTS 8,676,155 B2 *  3/2014 Fan ............... H04W 4/12
                                                370/428
9,277,379 B2 *  3/2016 Fan ............... H04W 4/12
(Continued)

FOREIGN PATENT DOCUMENTS

| JP | 2003-032498 A | 1/2003 |
| JP | 2011-029820 A | 2/2011 |
| JP | 2013-106119 A | 5/2013 |

OTHER PUBLICATIONS

An Office Action; "Notice of Reasons for Rejection," issued by the Japanese Patent Office dated Jun. 14, 2016, which corresponds to Japanese Patent Application No. 2014-150561 and is related to U.S. Appl. No. 14/805,010.

(Continued)

*Primary Examiner* — Jimmy H Tran
(74) *Attorney, Agent, or Firm* — Studebaker & Brackett PC (57) ABSTRACT

A communication control device and method that determine whether non-standard communication with a plurality of communications devices via a network is possible. The communication control device and method receive a communication request from a communication device, select as a communication partner another communication device that is specified by the communication device requesting communication, and prepares to implement one of a plurality of types of non-standard communication if such communication is possible with the communication device. If the non-standard communication is possible, the communication control device and method establish a communication session between the specified communication partner and the communication device. However, when the non-standard communication is not possible, the device and method cease communication with the communication device.

17 Claims, 7 Drawing Sheets

(52) U.S. Cl.
CPC .......... *H04L 65/1073* (2013.01); *H04L 67/14* (2013.01); *H04L 67/2814* (2013.01)

(56) References Cited

U.S. PATENT DOCUMENTS

| | | | | |
|---|---|---|---|---|
| 2001/0052108 | A1* | 12/2001 | Bowman-Amuah | G06Q 10/06 717/100 |
| 2002/0131082 | A1* | 9/2002 | Al-Varez-Baron Stoof | H04L 41/00 358/1.15 |
| 2003/0223092 | A1* | 12/2003 | Caffary, Jr. | G06Q 30/06 358/1.15 |
| 2004/0227973 | A1* | 11/2004 | Taylor | G06F 3/1204 358/1.15 |
| 2005/0078088 | A1* | 4/2005 | Davis | G06F 3/002 345/163 |
| 2006/0111941 | A1* | 5/2006 | Blom | G06Q 10/06 705/2 |
| 2011/0022723 | A1* | 1/2011 | Inoue | H04N 1/32411 709/238 |
| 2012/0077467 | A1* | 3/2012 | Fan | H04W 4/12 455/414.1 |
| 2012/0259722 | A1* | 10/2012 | Mikurak | G06Q 10/087 705/26.1 |
| 2013/0030826 | A1* | 1/2013 | Blom | G06Q 10/10 705/2 |
| 2014/0171135 | A1* | 6/2014 | Fan | H04W 4/12 455/466 |

OTHER PUBLICATIONS

The extended European search report issued by the European Patent Office dated Dec. 14, 2015, which corresponds to European Patent Application No. 15176255.6-1853 and is related to U.S. Appl. No. 14/805,010.

\* cited by examiner

| Multifunction peripheral | Alternative address information | Non-standard communication information | | |
|---|---|---|---|---|
| | Alternative address | Polling | F-code | Remote maintenance |
| A | 11.11.11.1 | I | P | P |
| B | 22.22.22.2 | P | I | I |
| C | 33.33.33.3 | P | P | P |

COMMUNICATION CONTROL DEVICE AND METHOD OF CONTROLLING COMMUNICATION CONTROL DEVICE FOR DETERMINING WHETHER NON-STANDARD COMMUNICATION IS POSSIBLE BASED ON NON-STANDARD COMMUNICATION INFORMATION REPRESENTING WHETHER EACH OF THREE TYPES OF NON-STANDARD COMMUNICATION IS POSSIBLE

INCORPORATION BY REFERENCE

The present application claims priority under 35 U.S.C. § 119 to Japanese Patent Application No. 2014-150561, filed Jul. 24, 2014. The contents of this application are incorporated herein by reference in their entirety.

BACKGROUND

The present disclosure relates to a communication control device, a communication system, and a method of controlling the communication control device.

A technique employs the Session Initiation Protocol (SIP) as a protocol for communication control in a communication system. The SIP is for example defined in Request for Comments (RFC) 3261 from the Internet Engineering Task Force (IETF). In a communication system using the SIP, for example, a plurality of communication devices (e.g., multifunction peripherals and facsimile machines) and an SIP server serving as a communication control device that controls communication are connected via a network.

The SIP server receives a communication request from a communication requester among the plurality of communication devices that is requesting communication. Upon receiving the communication request from the communication requester, the SIP server performs a process for establishing a session between the communication requester and a communication partner specified by the communication requester. As a result, the communication requester can transmit and receive data to and from the communication partner.

The communication devices (users of the communication devices) that can be the communication partner can each configure a forwarding setting for designating another communication device as a forwarding destination. In a situation in which the forwarding setting is configured, the SIP server establishes a session with the forwarding destination as the communication partner for the communication requester. That is, the forwarding destination receives data from the communication requester for the communication partner specified by the communication requester.

SUMMARY

A communication control device according to a first aspect of the present disclosure is a communication control device for connection with a plurality of communication devices via a network. The communication control device includes a communication section and a control section. The communication section receives a communication request from a communication requester. The communication requester is a communication device among the plurality of communication devices that is requesting communication. The control section selects as a communication partner a communication device different from the communication requester from among the plurality of communication devices based on the communication request from the communication requester received by the communication section and performs a process for establishing a session between the selected communication partner and the communication requester. Each of the plurality of communication devices is capable of implementing predetermined type of non-standard communication with another of the plurality of communication devices. When the communication request sent by the communication requester includes a non-standard communication implementation request requesting implementation of the non-standard communication, the control section selects a specified device as the communication partner even if an alternative device that performs communication with the communication requester for the specified device is assigned to the specified device, the specified device being a communication device specified as the communication partner by the communication requester.

A communication system according to a second aspect of the present disclosure includes the communication control device according to the first aspect of the present disclosure and a plurality of communication devices for connection with the communication control device via a network.

A control method according to a third aspect of the present disclosure is a method of controlling a communication control device for connection with a plurality of communication devices via a network. The control method includes: receiving a communication request from a communication requester, the communication requester being a communication device among the plurality of communication devices that is requesting communication; and selecting as a communication partner a communication device different from the communication requester from among the plurality of communication devices based on the communication request from the communication requester and performing a process for establishing a session between the selected communication partner and the communication requester. Each of the plurality of communication devices is capable of implementing predetermined type of non-standard communication with another of the plurality of communication devices. When the communication request sent by the communication requester includes a non-standard communication implementation request requesting implementation of the non-standard communication, a specified device is selected as the communication partner even if an alternative device that performs communication with the communication requester for the specified device is assigned to the specified device, the specified device being a communication device specified as the communication partner by the communication requester.

DETAILED DESCRIPTION

<General Configuration of Communication System>

Figure 1:
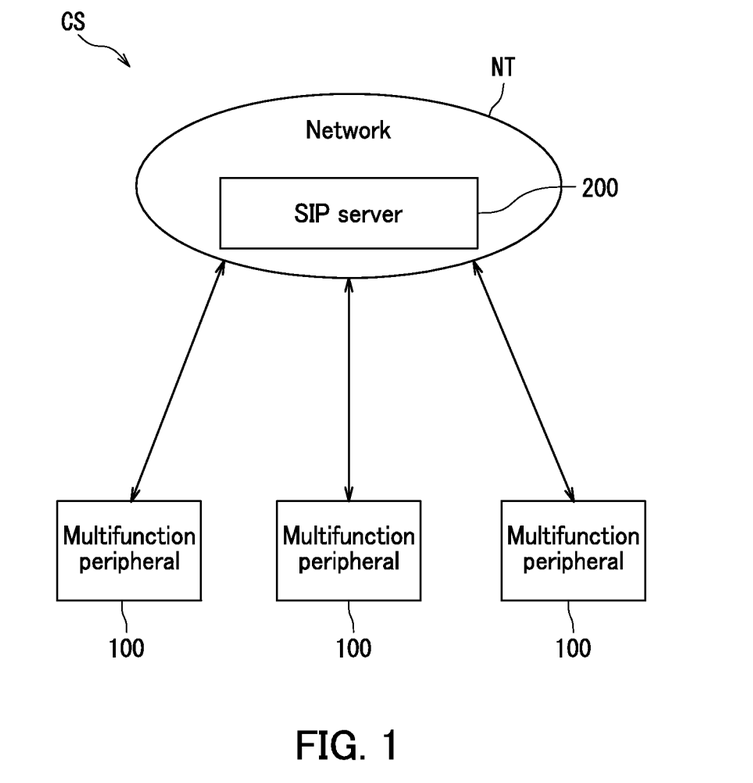
FIG. 1 is a schematic view illustrating a communication system according to an embodiment of the present disclosure.

As illustrated in FIG. 1, a communication system CS of an embodiment of the present disclosure includes a plurality of multifunction peripherals 100 and an SIP server 200. The devices included in the communication system CS are connected via a network NT in a communicable manner and communicate with one another using an SIP communication protocol. The multifunction peripherals 100 are equivalent to "communication devices", and the SIP server 200 is equivalent to a "communication control device".

The type of the communication devices that are included in the communication system CS is not particularly limited, and the communication devices may be for example devices having only a facsimile function rather than multifunction peripherals 100. The number of communication devices included in the communication system CS is not particularly limited. For example, although three multifunction peripherals 100 are included as the communication devices in FIG. 1, four or more communication devices may be included.

<Configuration of Each Device Included in Communication System>

Figure 2:
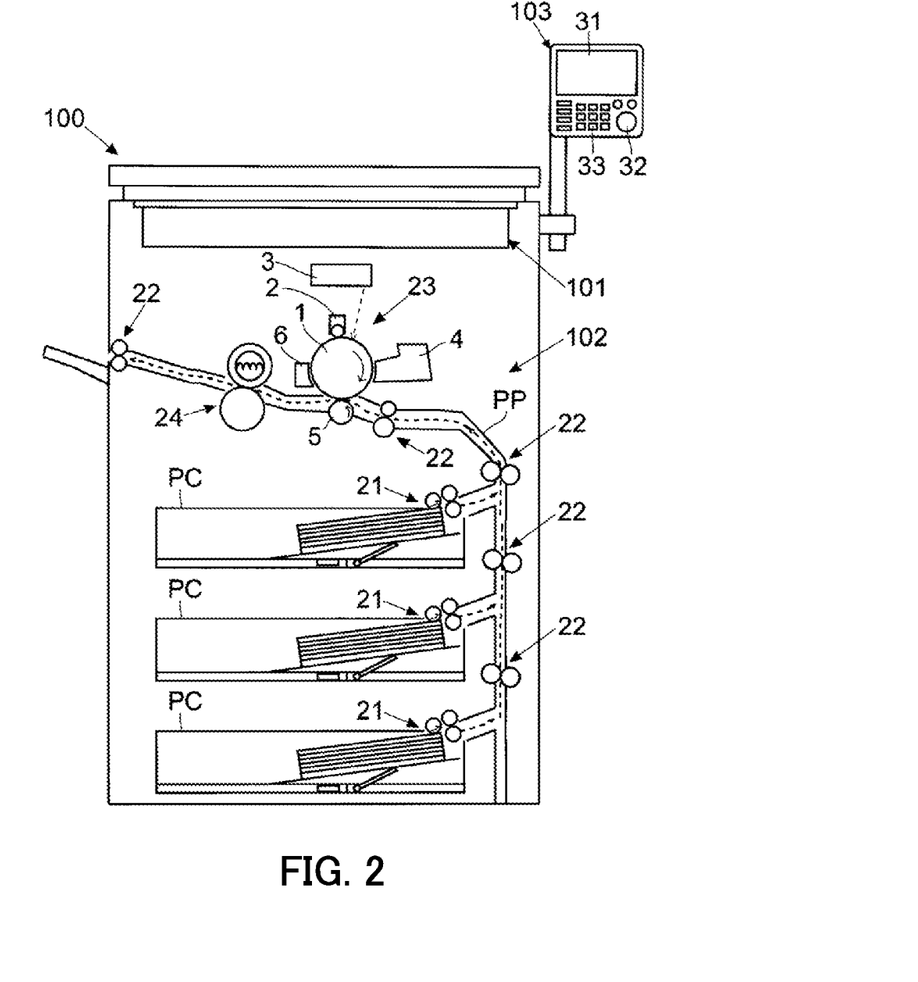
FIG. 2 is a schematic view illustrating a multifunction peripheral that is included in the communication system according to the embodiment of the present disclosure.

As illustrated in FIG. 2, each of the multifunction peripherals 100 includes an image reading section 101, a printing section 102, and an operation panel 103.

The image reading section 101 reads an original document and generates image data of the original document. For example, the image data of the original document obtained through the reading by the image reading section 101 is subjected to various processes by a main control section 110 to be described later. Facsimile data is generated based on the image data. Alternatively, an image to be printed by the printing section 102 is formed based on the image data.

The printing section 102 includes paper feed members 21, paper conveyance members 22, an image forming section 23, and a fixing section 24. The sheet feed members 21 feed paper stored in sheet feed cassettes PC into a paper conveyance path PP. The paper conveyance members 22 convey paper along the paper conveyance path PP. The image forming section 23 includes a photosensitive drum 1, a charger 2, a light exposure device 3, a developing device 4, a transfer roller 5, and a cleaning device 6. The image forming section 23 forms a toner image based on the image data and transfers the toner image onto paper. The fixing section 24 applies heat and pressure onto the toner image transferred onto the paper to fix the toner image.

The operation panel 103 includes a liquid crystal display panel 31 with a touch panel. The liquid crystal display panel 31 displays messages and soft keys for receiving various settings. The operation panel 103 has hard keys such as a start key 32 and a numeric keypad 33.

The configurations of the multifunction peripherals 100 included in the communication system CS (see FIG. 1) may be the same or different.

Figure 3:
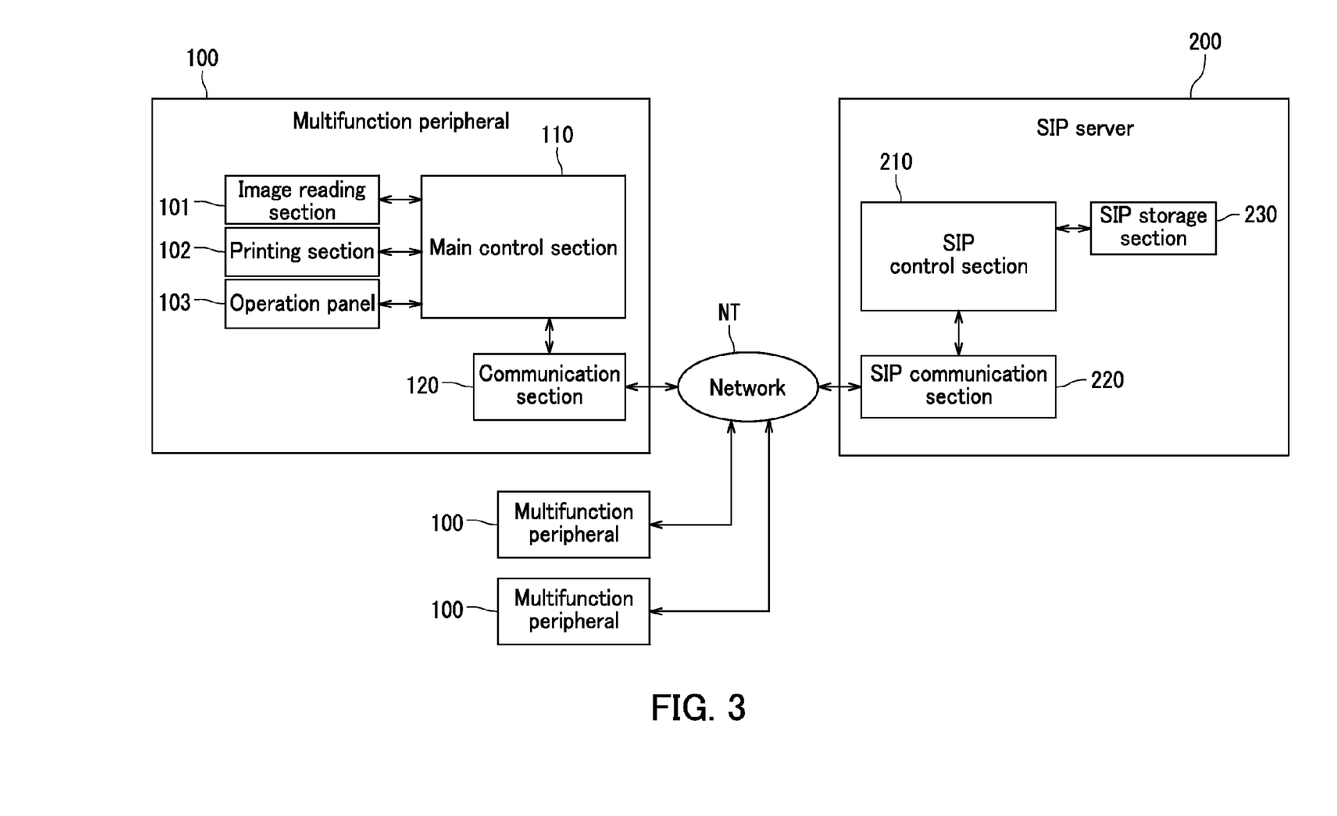
FIG. 3 is a diagram illustrating hardware configuration of the multifunction peripheral and an SIP server that are included in the communication system according to the embodiment of the present disclosure.

Each of the multifunction peripherals 100 includes the main control section 110 as illustrated in FIG. 3. The main control section 110 includes a CPU, an ASIC for image processing, and a storage section (e.g., ROM and/or RAM)) in which a control program and control data are stored. Each main control section 110 performs overall control of the corresponding multifunction peripheral 100 based on the control program and the control data. For example, the main control section 110 performs various processes on image data (e.g., scaling up/scaling down, density conversion, and data format conversion). The main control section 110 also controls reading by the image reading section 101 and printing by the printing section 102. Furthermore, the main control section 110 controls displaying by the operation panel 103 and detects operations performed on the operation panel 103.

The main control section 110 is connected with a communication section 120. The communication section 120 receives an instruction from the main control section 110, communicates with the SIP server 200, and requests establishment of a session with another of the multifunction peripherals 100. Once the session with the other multifunction peripheral 100 is established, the communication section 120 performs transmission and reception of various types of data such as facsimile data.

The SIP server 200 includes an SIP control section 210 and controls operation of an SIP communication section 220 that implements communication with the multifunction peripherals 100. The SIP control section 210 is connected with an SIP storage section 230 that stores therein various types of information. The SIP control section 210 is equivalent to a "control section" of the present disclosure. The SIP communication section 220 is equivalent to a "communication section" of the present disclosure. The SIP storage section 230 is equivalent to a "storage section" of the present disclosure.

The SIP server 200 performs a process for establishing a session between multifunction peripherals 100. In standard facsimile communication, for example, a multifunction peripheral 100 among the plurality of multifunction peripherals 100 that is to send facsimile data is a communication requester, and the communication requester sends a communication request to the SIP server 200. The communication request from the communication requester is received by the SIP communication section 220. Then, the SIP control section 210 selects a multifunction peripheral 100 (that is, specifies an IP address) specified as a communication partner from among the plurality of multifunction peripheral 100 based on the communication request from the communication requester. The SIP control section 210 then performs a process for establishing a session between the communication requester and the communication partner.

<Process when Alternative Device is Assigned as Communication Partner>

The SIP server 200 receives registration of a multifunction peripheral 100 that receives the facsimile data (hereinafter, referred to as an alternative device) for the specified multifunction peripheral 100 from among the multifunction peripherals 100 that can be the communication partner. In other words, users of the multifunction peripherals 100 that can be the communication partner can assign an alternative device that receives the facsimile data from the communication requester for their own multifunction peripheral 100. Hereinafter, the process will be described in detail with reference to a sequence diagram shown in FIG. 4.

Figure 4:
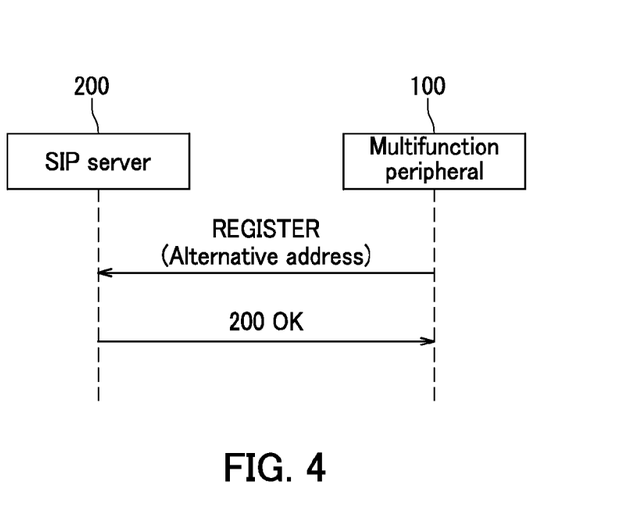
FIG. 4 is a sequence diagram for explaining a process for registering an alternative address in the communication system according to the embodiment of the present disclosure.

A multifunction peripheral 100 acting as a registration requester sends a registration request to the SIP server 200 for registering an alternative device (REGISTER request). The registration request includes an address (alternative address) of a multifunction peripheral 100 to be assigned as the alternative device. Upon the SIP communication section 220 receiving the registration request, the SIP control section 210 controls the SIP storage section 230 to store alternative address information representing the address of the multifunction peripheral 100 assigned as the alternative device in the registration request (see FIG. 5). The SIP communication section 220 then informs the multifunction peripheral 100 acting as the registration requester of the successful registration (200 OK response).

Each of the plurality of multifunction peripherals 100 may or may not request registration of an alternative device.

Upon the SIP communication section 220 receiving a communication request from a multifunction peripheral 100 acting as a communication requester, the SIP control section 210 determines whether or not an alternative device is registered in advance by a multifunction peripheral 100 specified as a communication partner (hereinafter, referred to as a specified device). That is, the SIP control section 210 determines whether or not an alternative device is assigned to the specified device. When an alternative device is assigned to the specified device, the SIP control section 210 selects the alternative device as the communication partner and performs a process for establishing a session between the selected communication partner (alternative device) and the communication requester. Hereinafter, the process will be described in detail with reference to a sequence diagram shown in FIG. 6. The multifunction peripheral 100 acting as a communication requester is referred to as a multifunction peripheral 100A, the multifunction peripheral 100 acting as a specified device is referred to as a multifunction peripheral 100B, and the multifunction peripheral 100 acting as an alternative device assigned to the multifunction peripheral 100B is referred to as a multifunction peripheral 100C in the following description.

Figure 5:
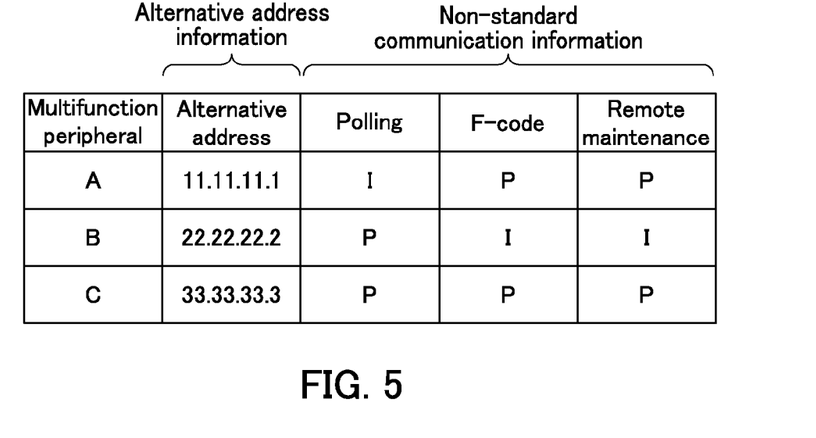
FIG. 5 is a diagram illustrating an example of alternative address information and non-standard communication information that is used in the communication system according to the embodiment of the present disclosure.
Figure 6:
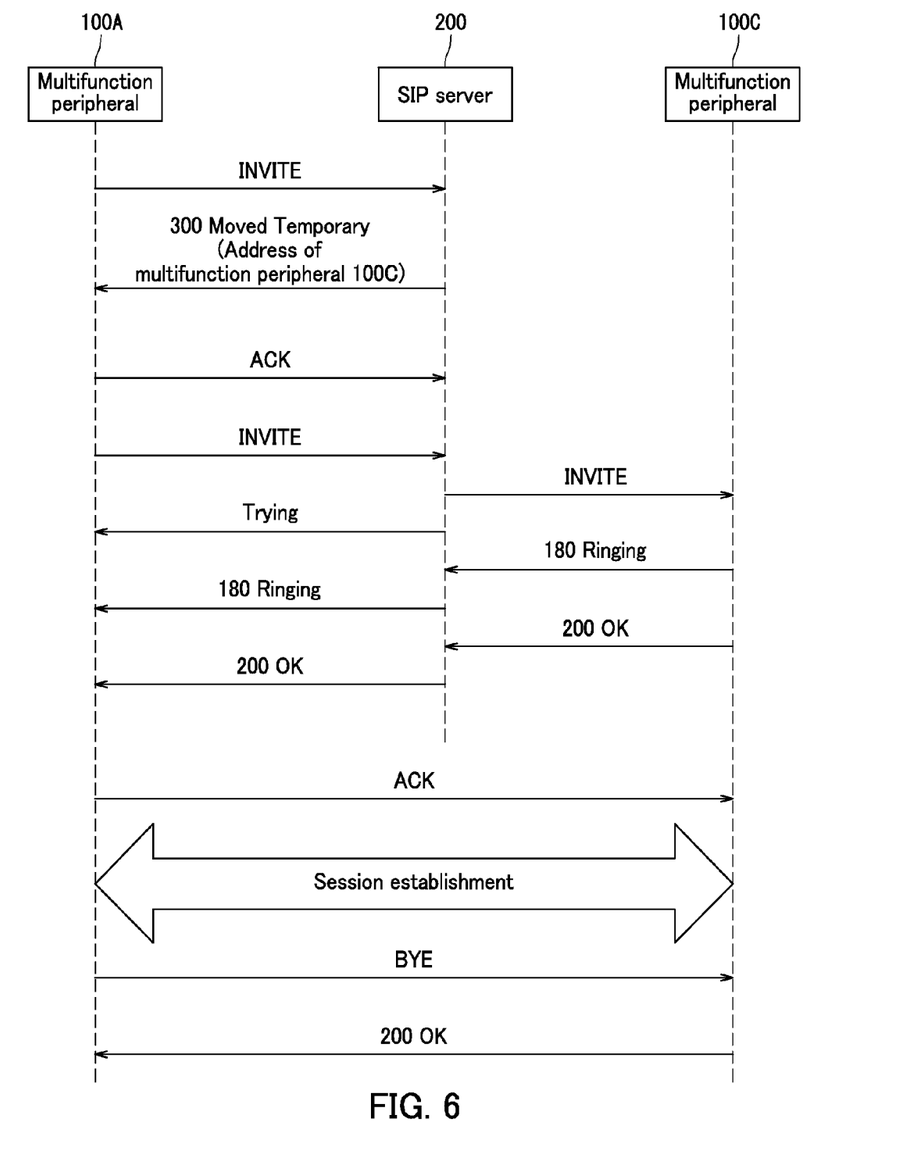
FIG. 6 is a sequence diagram for explaining a process for establishing a session with an alternative device as a communication partner in the communication system according to the embodiment of the present disclosure.

First, the multifunction peripheral 100A sends a request for communication with the multifunction peripheral 100B (INVITE request) to the SIP server 200. Upon the SIP communication section 220 receiving the communication request from the multifunction peripheral 100A, the SIP control section 210 checks whether or not an alternative address is registered with respect to the multifunction peripheral 100B (that is, whether or not an alternative device is assigned to the multifunction peripheral 100B) based on alternative address information (see FIG. 5). In this case, the multifunction peripheral 100C is assigned as an alternative device to the multifunction peripheral 100B. Accordingly, the SIP communication section 220 sends an address of the multifunction peripheral 100C acting as the alternative device assigned to the multifunction peripheral 100B to the multifunction peripheral 100A (300 Moved Temporary response).

Thereafter, the multifunction peripheral 100A notifies the SIP server 200 of acknowledgement of the response from the SIP server 200 (ACK response). Some users may not want the data to be forwarded to the multifunction peripheral 100C acting as the alternative device. The communication may be therefore ceased at this point.

Upon receiving the alternative address, the multifunction peripheral 100A sends another communication request to the SIP server 200 (INVITE request). The device specified as the communication partner in the current communication request is the multifunction peripheral 100C.

Upon receiving the communication request from the multifunction peripheral 100A, the SIP communication section 220 sends the communication request to the multifunction peripheral 100C (INVITE request). At the same time, the SIP communication section 220 notifies the multifunction peripheral 100A of the SIP server 200 trying to connect the multifunction peripheral 100A to the multifunction peripheral 100C (Trying response).

Upon receiving the communication request from the SIP server 200, the multifunction peripheral 100C notifies the multifunction peripheral 100A via the SIP server 200 that the multifunction peripheral 100C is being called (180 Ringing response). Subsequently, the multifunction peripheral 100C notifies the multifunction peripheral 100A via the SIP server 200 that the multifunction peripheral 100C will perform the facsimile communication (200 OK response). Thereafter, the multifunction peripheral 100A notifies the multifunction peripheral 100C of acknowledgement of the notifications from the multifunction peripheral 100C (ACK response). As a result, a session between the multifunction peripheral 100A and the multifunction peripheral 100C is established. That is, facsimile communication between the multifunction peripheral 100A and the multifunction peripheral 100C is enabled, and the facsimile data is sent from the multifunction peripheral 100A to the multifunction peripheral 100C. In other words, the multifunction peripheral 100C receives the facsimile data from the multifunction peripheral 100A.

Upon completion of the facsimile communication after the session establishment, the multifunction peripheral 100A notifies the multifunction peripheral 100C of the completion of the facsimile communication (BYE request). The multifunction peripheral 100C then sends a response to the notification from the multifunction peripheral 100A (200 OK response).

<Process when Request for Implementation of Non-Standard Communication is Received>

Each of the plurality of multifunction peripherals 100 is capable of implementing non-standard communication (predetermined type of communication or predetermined type of special communication) with another of the plurality of multifunction peripherals 100. The non-standard communication is communication that is preliminary determined to be non-standard as being different from standard facsimile communication. The non-standard communication includes for example polling reception, F-code communication, and remote maintenance.

The polling reception refers to communication through which a communication requester acquires data saved in a communication partner. More specifically, the polling reception is performed when the communication requester is to acquire a polling document saved in the communication partner. For example, a multifunction peripheral 100 capable of implementing polling reception has a save area for saving a polling document. The communication requester can acquire the polling document saved in the communication partner by communicating with the communication partner in which the polling document is saved. That is, the communication requester can receive the polling document sent from the communication partner.

The F-code communication refers to communication using an F-code. More specifically, the F-code communication is used for sending and receiving a confidential document. For example, a multifunction peripheral 100 capable of implementing F-code communication has save areas each associated with predetermined identification information (sub address and/or password). A communication requester can specify a save area to save a confidential document in from among the save areas of a communication partner by sending the predetermined identification information to the communication partner.

The remote maintenance refers to communication for performing maintenance on a communication partner remotely from a communication requester. More specifically, the remote maintenance is implemented to perform maintenance on the communication partner remotely from the communication requester. The remote maintenance for example allows settings in the communication partner to be checked at the communication requester. The remote maintenance further allows settings in the communication partner to be changed at the communication requester.

In order to implement non-standard communication with a communication partner, a communication requester includes a non-standard communication implementation request requesting implementation of non-standard communication in a communication request to be sent to the SIP server 200. When a device specified as the communication partner by the communication requester is in a state ready for the non-standard communication, the SIP server 200 selects the specified device as the communication partner and performs a process for establishing a session between the selected communication partner (specified device) and the communication requester.

The SIP server 200 stores therein non-standard communication information representing whether or not each of the multifunction peripherals 100 that can be the communication partner is in a state ready for non-standard communication and determines whether or not each multifunction peripheral 100 is in a state ready for non-standard communication based on the non-standard communication information. For example, the SIP server 200 receives from each multifunction peripheral 100 registration of the non-standard communication information of each multifunction peripheral 100. The non-standard communication information may be referred to as device state information. Hereinafter, the process will be described in detail with reference to a sequence diagram shown in FIG. 7.

Figure 7:
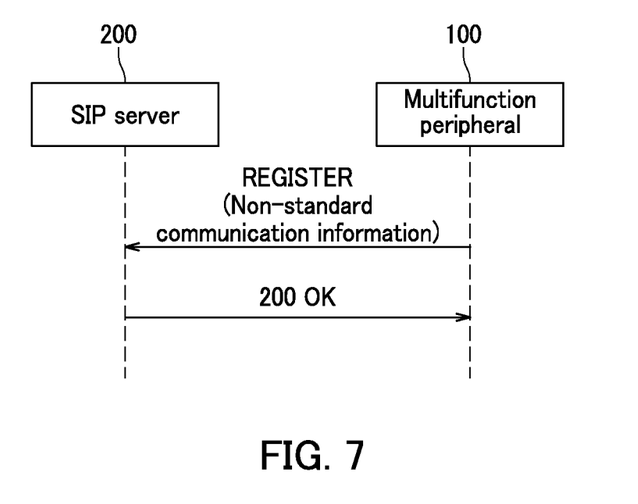
FIG. 7 is a sequence diagram for explaining a process for registering non-standard communication information in the communication system according to the embodiment of the present disclosure.

A multifunction peripheral 100 acting as a registration requester sends a registration request to the SIP server 200 for registering non-standard communication information (REGISTER request). The registration request includes non-standard communication information associated with the multifunction peripheral 100 acting as the registration requester. Upon the SIP communication section 220 receiving the registration request, the SIP control section 210 controls the SIP storage section 230 to store the non-standard communication information included in the registration request in association with the multifunction peripheral 100 acting as the registration requester (see FIG. 5). In FIG. 5, "P (possible)" represents that the device is in a state ready for non-standard communication, and "I (impossible)" represents that the device is not in a state ready for non-standard communication. The SIP communication section 220 then informs the multifunction peripheral 100 acting as the registration requester of the successful registration (200 OK response).

The SIP control section 210 may execute the registration of non-standard communication information (that is, storing of the non-standard communication information in the SIP storage section 230) and the registration of an alternative device (that is, storing of alternative address information in the SIP storage section 230) at the same time. The SIP control section 210 may update the non-standard communication information of a multifunction peripheral 100 acting as a registration requester every time the state of the device changes (e.g., when the presence or absence of a polling document changes). Alternatively, the SIP control section 210 may update the non-standard communication information periodically (e.g., every few days).

A communication requester requesting implementation of non-standard communication specifies a communication partner for the non-standard communication as in implementation of standard facsimile communication. However, an alternative device may be assigned to the device specified as the communication partner. If that is the case for standard facsimile communication, a session is established between the communication requester and the alternative device. For non-standard communication, however, communication needs to be enabled between the communication requester and the specified device; there is no point in establishing a session between the communication requester and the alternative device.

The SIP control section 210 therefore selects the specified device as the communication partner in response to the non-standard communication implementation request from the communication requester even if an alternative device is assigned to the device specified as the communication partner and performs a process for establishing a session between the selected communication partner (specified device) and the communication requester. Hereinafter, the process will be described in detail with reference to a sequence diagram shown in FIG. 8. The multifunction peripheral 100 acting as a communication requester is referred to as a multifunction peripheral 100A, the multifunction peripheral 100 acting as a specified device is referred to as a multifunction peripheral 100B, and the multifunction peripheral 100 acting as an alternative device assigned to the multifunction peripheral 100B is referred to as a multifunction peripheral 100C in the following description.

Figure 8:
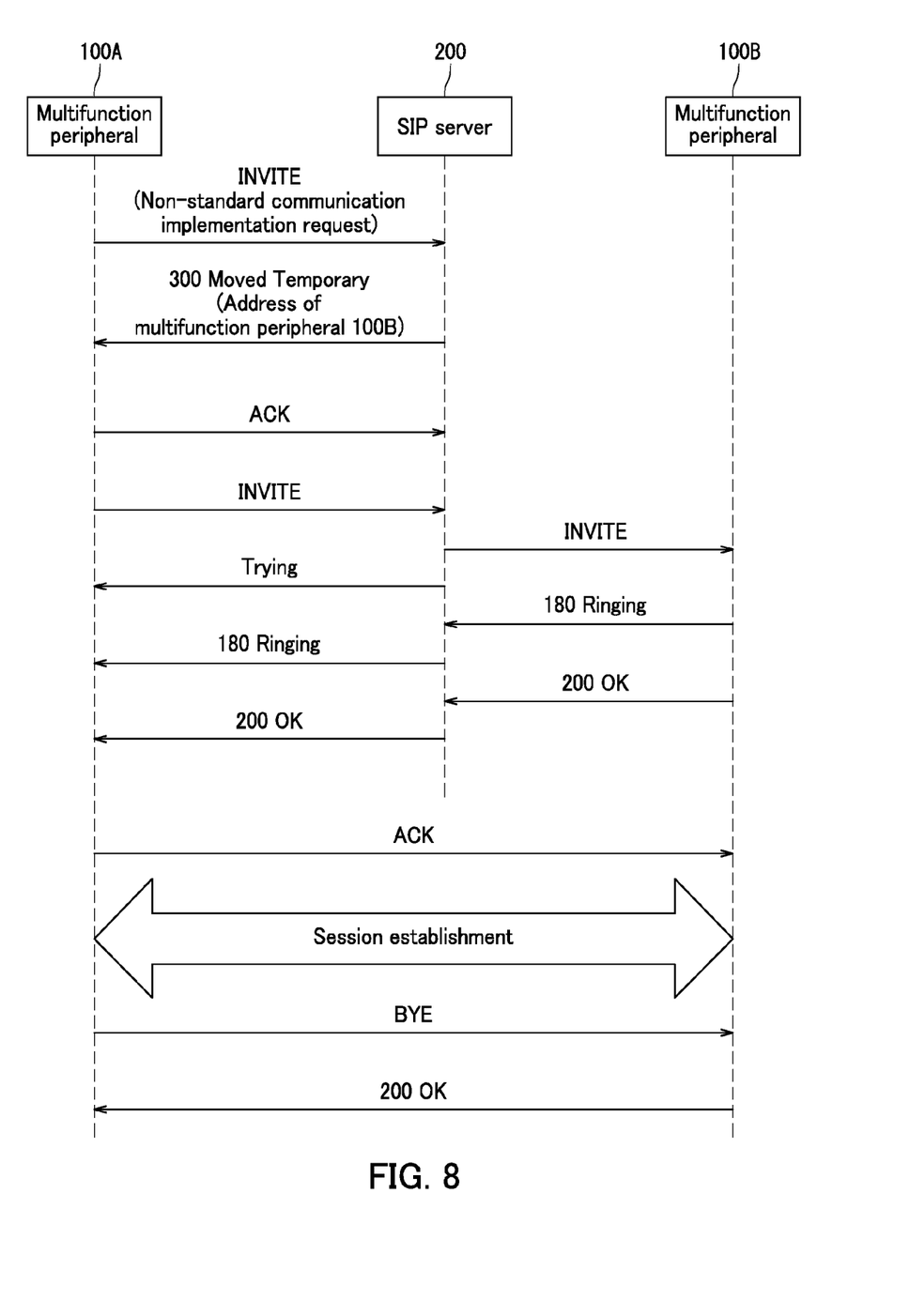
FIG. 8 is a sequence diagram for explaining a process to be performed when a request for implementation of non-standard communication is received from a communication requester in the communication system according to the embodiment of the present disclosure.

First, the multifunction peripheral 100A sends to the SIP server 200 a request for communication with the multifunction peripheral 100B (INVITE request). The communication request to be sent to the SIP server 200 includes a non-standard communication implementation request requesting implementation of non-standard communication (e.g., polling reception).

Upon the SIP communication section 220 receiving the communication request from the multifunction peripheral 100A, the SIP control section 210 determines whether or not the device specified as the communication partner is in a state ready for the non-standard communication based on non-standard communication information (see FIG. 5). For polling reception, for example, it is determined that the specified device is in a state ready for the non-standard communication when a polling document is saved in the specified device, whereas it is determined that the specified device is not in a state ready for the non-standard communication when no polling document is saved in the specified device.

Upon the SIP control section 210 determining that the specified device is in a state ready for the non-standard communication, the SIP communication section 220 sends an address of the multifunction peripheral 100B acting as the specified device to the multifunction peripheral 100A (300 Moved Temporary response). In this case, the address of the multifunction peripheral 100C assigned as the alternative device for the multifunction peripheral 100B is not sent to the multifunction peripheral 100A despite the presence thereof. Thereafter, the multifunction peripheral 100A notifies the SIP server 200 of acknowledgement of the response from the SIP server 200 (ACK response). The multifunction peripheral 100A then sends a communication request to the SIP server 200 again (INVITE request).

Upon receiving the communication request from the multifunction peripheral 100A, the SIP communication section 220 sends the communication request to the multifunction peripheral 100B (INVITE request). At the same time, the SIP communication section 220 notifies the multifunction peripheral 100A of the SIP server 200 trying to connect the multifunction peripheral 100A to the multifunction peripheral 100B (Trying response).

Upon receiving the communication request from the SIP server 200, the multifunction peripheral 100B notifies the multifunction peripheral 100A via the SIP server 200 that the multifunction peripheral 100B is being called (180 Ringing response). Subsequently, the multifunction peripheral 100B notifies the multifunction peripheral 100A via the SIP server 200 that the multifunction peripheral 100B will perform the non-standard communication (200 OK response). Thereafter, the multifunction peripheral 100A notifies the multifunction peripheral 100B of acknowledgement of the notifications from the multifunction peripheral 100B (ACK response). As a result, a session between the multifunction peripheral 100A and the multifunction peripheral 100B is established. That is, the non-standard communication between the multifunction peripheral 100A and the multifunction peripheral 100B is enabled.

Upon completion of the non-standard communication after the session establishment, the multifunction peripheral 100A notifies the multifunction peripheral 100B of the completion of the non-standard communication (BYE request). The multifunction peripheral 100B then sends a response to the notification from the multifunction peripheral 100A (200 OK response).

The sequence shown in FIG. 8 includes a case where the communication request from the multifunction peripheral 100A does not include a non-standard communication implementation request. In this case, the SIP control section 210 selects the multifunction peripheral 100C, which is the alternative device assigned to the multifunction peripheral 100B, as the communication partner, and performs a process for establishing a session between the multifunction peripheral 100A and the multifunction peripheral 100C.

In some cases, the multifunction peripheral 100B (specified device) may not be in a state ready for the non-standard communication. For example, the polling reception cannot be implemented unless a polling document is saved in the multifunction peripheral 100B. The F-code communication cannot be implemented unless the multifunction peripheral 100B has a relevant save area. The remote maintenance cannot be implemented unless the multifunction peripheral 100B is configured to accept remote maintenance.

In a situation in which the multifunction peripheral 100B is not in a state ready for the non-standard communication, the SIP communication section 220 notifies the multifunction peripheral 100A that it is impossible to implement the non-standard communication in response to the communication request from the multifunction peripheral 100A (406 Not Acceptable response), which is not shown in the figure. Thereafter, the multifunction peripheral 100A notifies the SIP server 200 of acknowledgement of the response from the SIP server 200. At this point, the SIP control section 210 ceases communication with the multifunction peripheral 100A.

The SIP server 200 (communication control device) of the present embodiment includes: the SIP communication section 220 (communication section) that receives a communication request from a communication requester, which is a multifunction peripheral 100 among the plurality of multifunction peripherals 100 (communication devices) that is requesting communication; and the SIP control section 210 that selects as a communication partner a multifunction peripheral 100 different from the communication requester from among the plurality of multifunction peripherals 100 based on the communication request sent from the communication requester and received by the SIP communication section 220, and performs a process for establishing a session between the selected communication partner and the communication requester. Each of the plurality of multifunction peripherals 100 is capable of implementing non-standard communication with another of the plurality of multifunction peripherals 100. In a situation in which a communication request sent by a communication requester includes a non-standard communication implementation request requesting implementation of non-standard communication, the SIP control section 210 selects a specified device as a communication partner even if an alternative device that performs communication with the communication requester for the specified device is assigned. The specified device is a communication device specified as the communication partner by the communication requester.

According to the configuration of the present embodiment, a multifunction peripheral 100 specified as the communication partner (specified device) is selected as a communication partner for a communication requester in response to a request for implementation of non-standard communication with the specified device even if an alternative device that performs communication with the communication requester for the specified device is assigned (that is, the alternative device is not selected). That is, a session is established between the communication requester and the communication partner specified by the communication requester, implementing the non-standard communication therebetween. Thus, convenience is increased to a user of the communication requester who wishes to implement the non-standard communication.

When the non-standard communication is polling reception, for example, a problem is prevented in that the communication requester receives an unnecessary document (that is, a document saved in the alternative device). Prevention of such a problem prevents a waste of paper since the communication requester does not perform printing based on unnecessary data.

When the non-standard communication is F-code communication, a confidential document is prevented from being sent to the alternative device. As a result, the confidentiality of the confidential document is protected.

When the non-standard communication is for remote maintenance, a problem is prevented in that maintenance is performed on the alternative device despite the intention to perform the maintenance on the specified device.

On the other hand, as described above, the SIP control section 210 of the present embodiment selects the alternative device as the communication partner in a situation in which the communication request sent by the communication requester does not include a non-standard communication implementation request. As a result, in standard facsimile communication, the alternative device receives facsimile data from the communication requester in accordance with the intension of the user of the specified device as long as the alternative device that performs communication with the communication requester for the specified device is assigned.

In the present embodiment, non-standard communication information representing whether or not each of the multi-function peripherals 100 is in a state ready for non-standard communication is stored in the SIP storage section 230 as described above. In a situation in which the communication request sent by the communication requester includes a non-standard communication implementation request, the SIP control section 210 determines whether or not the specified device is in a state ready for the non-standard communication based on the non-standard communication information. When the specified device is in a state ready for the non-standard communication, the SIP control section 210 selects the specified device as the communication partner and performs a process for establishing a session between the selected communication partner (specified device) and the communication requester. On the other hand, when the specified device is not in a state ready for the non-standard communication, the SIP control section 210 ceases communication with the communication requester. As a result, unnecessary communication can be omitted.

Note that all matter explained in the embodiment disclosed herein is in no way limiting and should be considered to merely illustrate an example. The scope of the present disclosure is defined not by the above embodiment but by the claims. Also, any modifications within the scope of the claims or equivalent in meaning thereto are also included in the scope of the present disclosure.

What is claimed is:

1. A communication control device for connection with a plurality of communication devices via a network, the communication control device comprising:
    a storage section;
    a transmitter-receiver that receives a communication request from a communication requester, the communication requester being a communication device among the plurality of communication devices that is requesting communication; and
    a controller that selects as a communication partner a communication device different from the communication requester from among the plurality of communication devices based on the communication request from the communication requester received by the transmitter-receiver and performs a process for establishing a session between the selected communication partner and the communication requester, wherein
    each of the plurality of communication devices is capable of implementing predetermined type of non-standard communication with another of the plurality of communication devices,
    the non-standard communication includes three types of non-standard communication: polling reception through which the communication requester acquires data saved in the communication partner, F-code communication using an F-code, and communication through which maintenance is performed on the communication partner remotely from the communication requester,
    when the communication request sent by the communication requester includes a non-standard communication implementation request requesting implementation of one or more of the three types of non-standard communication, the controller selects a specified device as the communication partner even if an alternative device that performs communication with the communication requester for the specified device is assigned to the specified device, the specified device being a communication device specified as the communication partner by the communication requester,
    when the transmitter-receiver receives from a registration requester a registration request requesting registration of non-standard communication information and information of the alternative device, the controller controls the storage section to store the non-standard communication information and the information of the alternative device in association with the registration requester at the same time, the registration requester being a communication device among the plurality of communication devices, the non-standard communication information representing whether or not each of the plurality of communication devices is in a state ready for each of the three types of non-standard communication,
    when the communication request sent by the communication requester includes the non-standard communication implementation request, the controller determines whether or not the specified device is in a state ready for at least one of the one or more types of non-standard communication based on the non-standard communication information,
    when the specified device is in the state ready for at least one of the one or more types of non-standard communication, the controller selects the specified device as the communication partner and performs a process for establishing a session between the selected communication partner and the communication requester, and
    when the specified device is in a state not ready for any of the one or more types of non-standard communication, the controller ceases communication with the communication requester.

2. The communication control device according to claim 1, wherein
    when the communication request sent by the communication requester does not include the non-standard communication implementation request, the controller selects the alternative device as the communication partner.

3. The communication control device according to claim 2, wherein
    when the communication request sent by the communication requester does not include the non-standard communication implementation request, the controller selects the alternative device as the communication partner and does not select the specified device specified by the communication requester.

4. The communication control device according to claim 1, wherein
    the controller updates the non-standard communication information when a state of the registration requester changes.

5. The communication control device according to claim 1, wherein
    the controller updates the non-standard communication information periodically.

6. The communication control device according to claim 1, wherein
    when the transmitter-receiver receives the communication request including the non-standard communication implementation request from the communication requester, the controller determines whether or not the specified device is in the state ready for at least one of the one or more types of non-standard communication based on the non-standard communication information and does not select the alternative device.

7. The communication control device according to claim 1, wherein
when the transmitter-receiver receives the communication request including the non-standard communication implementation request from the communication requester and the non-standard communication information in the storage section indicates that the specified device specified by the communication request is in a state ready for at least one of the one or more types of non-standard communication, the controller selects the specified device as the communication partner and does not select the alternative device.

8. The communication control device according to claim 1, wherein
when the transmitter-receiver receives the communication request including the non-standard communication implementation request from the communication requester and the non-standard communication information in the storage section indicates that the specified device specified by the communication request is in a state not ready for any of the one or more types of non-standard communication, the transmitter-receiver notifies the communication requester that implementation of the non-standard communication is disabled.

9. The communication control device according to claim 8, wherein
when the transmitter-receiver receives an acknowledgement response from the communication requester after the transmitter-receiver notifies the communication requester that implementation of the non-standard communication is disabled, the controller ceases communication with the communication requester.

10. A method of controlling a communication control device for connection with a plurality of communication devices via a network, the method comprising:
receiving a communication request from a communication requester, the communication requester being a communication device among the plurality of communication devices that is requesting communication; and
selecting as a communication partner a communication device different from the communication requester from among the plurality of communication devices based on the communication request from the communication requester and performing a process for establishing a session between the selected communication partner and the communication requester, wherein
each of the plurality of communication devices is capable of implementing predetermined type of non-standard communication with another of the plurality of communication devices,
the non-standard communication includes three types of non-standard communication: polling reception through which the communication requester acquires data saved in the communication partner, F-code communication using an F-code, and communication through which maintenance is performed on the communication partner remotely from the communication requester,
when the communication request sent by the communication requester includes a non-standard communication implementation request requesting implementation of one or more of the three types of non-standard communication, a specified device is selected as the communication partner even if an alternative device that performs communication with the communication requester for the specified device is assigned to the specified device, the specified device being a communication device specified as the communication partner by the communication requester,
each of the plurality of communication devices is configured to store therein non-standard communication information representing whether or not the communication device is in a state ready for each of the three types of non-standard communication, and
the method further comprises:
storing the non-standard communication information and information of the alternative device in association with a registration requester at the same time when a registration request requesting registration of the non-standard communication information and the information of the alternative device is received from the registration requester, the registration requester being a communication device among the plurality of communication devices,
determining whether or not the specified device is in a state ready for at least one of the one or more types of non-standard communication based on the non-standard communication information when the communication request sent by the communication requester includes the non-standard communication implementation request;
selecting the specified device as the communication partner and performing a process for establishing a session between the selected communication partner and the communication requester when the specified device is in the state ready for at least one of the one or more types of non-standard communication; and
ceasing communication between the communication control device and the communication requester when the specified device is in a state not ready for any of the one or more types of non-standard communication.

11. The method according to claim 10, further comprising:
updating the non-standard communication information in association with the registration requester when the non-standard communication information in the registration requester is changed.

12. The method according to claim 10, further comprising:
updating the non-standard communication information periodically.

13. The method according to claim 10, wherein
in the determining, the alternative device is not selected.

14. The method according to claim 10, wherein
in the selecting the specified device as the communication partner, the alternative device is not selected.

15. The method according to claim 10, further comprising:
when the communication request including the non-standard communication implementation request from the communication requester is received and the non-standard communication information in the storage section indicates that the specified device specified by the communication request is in a state not ready for any of the one or more types of non-standard communication, notifying the communication requester that implementation of the non-standard communication is disabled.

16. The method according to claim 15, further comprising:
- ceasing communication with the communication requester when an acknowledgement response from the communication requester is received after the notifying.

17. The method according to claim 10, further comprising:
- when the communication request sent by the communication requester does not include the non-standard communication implementation request, selecting the alternative device as the communication partner and not selecting the specified device specified by the communication requester.

* * * * *